(12) United States Patent
Ioffe (10) Patent No.: US 9,311,403 B1
(45) Date of Patent: Apr. 12, 2016

(54) HASHING TECHNIQUES FOR DATA SET SIMILARITY DETERMINATION

(75) Inventor: Sergey Ioffe, Mountain View, CA (US)

(73) Assignee: Google Inc., Mountain View, CA (US)

(*) Notice: Subject to any disclaimer, the term of this patent is extended or adjusted under 35 U.S.C. 154(b) by 563 days.

(21) Appl. No.: 13/162,061

(22) Filed: Jun. 16, 2011

Related U.S. Application Data (60) Provisional application No. 61/355,389, filed on Jun. 16, 2010.

(51) Int. Cl.
*G06F 17/30* (2006.01)
(52) U.S. Cl.
CPC ................... *G06F 17/30864* (2013.01)
(58) Field of Classification Search
CPC ............ G06F 17/30864; G06F 17/30949; G06F 17/30501; G06Q 10/10
USPC .................................. 707/749, 758
See application file for complete search history.

(56) References Cited

U.S. PATENT DOCUMENTS

| | | | | |
|---|---|---|---|---|
| 8,527,516 | B1* | 9/2013 | Spasojevic | G06F 17/30873 707/738 |
| 9,159,327 | B1* | 10/2015 | Postelnicu | G10L 19/018 |
| 2004/0260694 | A1* | 12/2004 | Chaudhuri | G06F 17/30542 |
| 2007/0038659 | A1* | 2/2007 | Datar | G06Q 30/02 |
| 2009/0043797 | A1* | 2/2009 | Dorie et al. | 707/101 |
| 2009/0192980 | A1* | 7/2009 | Beyer et al. | 707/2 |
| 2010/0023506 | A1* | 1/2010 | Sahni | G06F 17/30876 707/E17.014 |
| 2010/0223336 | A1* | 9/2010 | Fu et al. | 709/205 |
| 2014/0344195 | A1* | 11/2014 | Drew | G06F 17/30705 706/12 |
| 2015/0120720 | A1* | 4/2015 | Dhara | H04L 67/1002 707/728 |

OTHER PUBLICATIONS

Chum, O., et al., ("Near duplicate image detection: rain-hash and tf-idf weighting," in Proceedings of the British Machine Vision Conference, pp. 50.1-50.10, BVMA Press, United Kingdom (2008)).*
Kleinberg et al. ( "Approximation algorithms for classification problems with pairwise relationships: Metric labeling and markov random fields," in FOCS '99: Proceedings of the 40th Annual Symposium on Foundations of Computer Science, p. 14, Association for Computing Machinery, United States (1999)).*
Charikar ("Similarity Estimation Techniques from Rounding Algorithms"; STOC '02: Proceedings of the thirty-fourth annual ACM symposium on Theory of computing, pp. 380-388, Association for Computing Machinery, United States (2002)).*

(Continued)

*Primary Examiner* — Noosha Arjomandi
(74) *Attorney, Agent, or Firm* — Fish & Richardson P.C.

(57) ABSTRACT

Methods, systems and computer program product embodiments for hashing techniques for determining similarity between data sets are described herein. A method embodiment includes, initializing a random number generator with a weighted min-hash value as a seed, wherein the weighted min-hash value approximates a similarity distance between data sets. A number of bits in the weighted min-hash value is determined by uniformly sampling an integer bit value using the random number generator. A system embodiment includes a repository configured to store a plurality of data sets and a hash generator configured to generate weighted min-hash values from the data sets. The system further includes a similarity determiner configured to determine a similarity between the data sets.

13 Claims, 10 Drawing Sheets

(56) References Cited

OTHER PUBLICATIONS

Chum, O., et al., ("Near duplicate image detection: min-hash and tf-idf weighting," in Proceedings of the British Machine Vision Conference, pp. 50.1-50.10, BVMA Press, United Kingdom (2008)).*

Andoni, A. and Indyk P., "Near-optimal hashing algorithms for approximate nearest neighbor in high dimensions," *FOCS '06: Proceedings of the 47th Annual IEEE Symposium on Foundations of Computer Science*, pp. 459-468, Association for Computing Machinery, United States (2006).

Broder, A.Z., et al., "Min-wise independent permutations," *Journal of Computer System Sciences*, 60 (3):630-659, Academic Press, United States (2000).

Charikar, M. S., "Similarity estimation techniques from rounding algorithms,"0 *STOC '02: Proceedings of the thirty-fourth annual ACM symposium on Theory of computing*, pp. 380-388, Association for Computing Machinery, United States (2002).

Chum, O., et al., "Near duplicate image detection: min-hash and tf-idf weighting," *in Proceedings of the British Machine Vision Conference*, pp. 50.1-50.10, BVMA Press, United Kingdom (2008).

Datar, M., et al., "Locality-sensitive hashing scheme based on p-stable distributions," *SCG '04: Proceedings of the twentieth annual symposium on Computational geometry*, pp. 253-262, Association for Computing Machinery, United States (2004).

Indyk, P. and Motwani, R., "Approximate nearest neighbors: towards removing the curse of dimensionality," *STOC '98: Proceedings of the thirtieth annual ACM symposium on Theory of computing*, pp. 604-613, Association for Computing Machinery, United States (1998).

Ioffe, S., "Improved Consistent Sampling, Weighted Minhash and L1 Sketching," (*ICDM*), *2010 IEEE 10$^{th}$ International Conference on Data Mining (ICDM)*, pp. 246-255, Conference Publishing Services, United States (2010).

Kleinberg, J. and Tardos, E., "Approximation algorithms for classification problems with pairwise relationships: Metric labeling and markov random fields," *in FOCS '99: Proceedings of the 40th Annual Symposium on Foundations of Computer Science*, p. 14, Association for Computing Machinery, United States (1999).

Li, P., and König, C., "b-Bit Minwise Hashing," *in World Wide Web Conference 2010*, International World Wide Web Conference Committee, United States (2010).

Li, P., et al., "Nonlinear Estimators and Tail Bounds for Dimension Reduction in 11 Using Cauchy Random Projections," *Journal of Machine Learning Research* 8:2497-2532, Microtome Publishing, United States (2007).

Manasse, M., et al., "Consistent weighted sampling," *Microsoft Research TechReport*. MSR-TR-2010-73, Microsoft Research, United States (2008).

Marsaglia, G., and Tsang, W. W., "The Ziggurat Method for Generating Random Variables," *Journal of Statistical Software* 5(8):1-7, American Statistical Association, United States (2000).

Salakhutdinov, R. and Hinton, G., "Semantic hashing," *IRGM 2007 workshop at the SIGIR 2007 conference*, 8 pages, Association for Computing Machinery, United States (2007).

Weiss, Y., et al., "Spectral hashing," *Proceedings of the Twenty-Second Annual Conference on Neural Information Processing Systems*, Curran Associates, Inc., United States (2008).

\* cited by examiner

Input: Vector $\mathbf{u} = (u_F \geq 0)$, and seed $h$
Output: $\text{WMH}_h(\mathbf{u})$ is Weighted MinHash of $\mathbf{u}$, so that $\Pr_h[\text{WMH}_h(\mathbf{u}) = \text{WMH}_h(\mathbf{v})] = J(\mathbf{u}, \mathbf{v})$ for all $F$ such that $u_F > 0$ do
   InitializeRandomGenerator(seed $= (F, h)$)
   $M \leftarrow \text{ExponentialRandom}() \times \frac{1}{W_F}$
   $i \leftarrow 0$
   if $u_F \geq W_F$ then
     $X \leftarrow W_F$
     while $X < u_F$ do
       $X \leftarrow X + \text{ExponentialRandom}() \times \frac{1}{M}$
       if $X \leq u_F$ then
         $M \leftarrow \text{UniformRandom}() \times M$
         $i \leftarrow i + 1$
       end if
     end while
   else
     $X \leftarrow \text{UniformRandom}() \times W_F$
     while $X > u_F$ do
       $M \leftarrow M + \text{ExponentialRandom}() \times \frac{1}{X}$
       $X \leftarrow \text{UniformRandom}() \times X$
       $i \leftarrow i - 1$
     end while
   end if
   $M_F^* \leftarrow M$
   $i_F^* \leftarrow i$
end for
$F^* \leftarrow \arg\min_F M_F^*$
return $\text{WMH}_h(\mathbf{u}) \leftarrow (F^*, i_{F^*}^*)$

Input: Vector $S = (S_k \geq 0)$
Output: Consistent uniform sample $(k^*, y^*)$ from $\{(k, y) : 0 \leq y \leq S_k\}$

*Sample random variables, independent of the input S*
for all $k$ do
    Sample independent $r_k, c_k \sim \Gamma(2, 1)$ and $\beta_k \sim \text{Uniform}(0, 1)$
end for
*The remainder depends on the input S*
for all $k$ such that $S_k > 0$ do
    $t_k \leftarrow \left\lfloor \frac{\ln S_k}{r_k} + \beta_k \right\rfloor$
    $y_k \leftarrow \exp(r_k(t_k - \beta_k))$
    $a_k \leftarrow c_k / (y_k \exp(r_k))$
end for
$k^* \leftarrow \arg\min_k a_k$
$y^* \leftarrow y_{k^*}$
return Consistent sample $(k^*, y^*)$ or Weighted Minhash $(k^*, t_{k^*})$

HASHING TECHNIQUES FOR DATA SET SIMILARITY DETERMINATION

CROSS-REFERENCE TO RELATED APPLICATION

This patent application claims the benefit of U.S. Provisional Patent Application No. 61/355,389, filed Jun. 16, 2010, entitled "Hashing Techniques For Data Set Similarity Determination," which is incorporated herein by reference in its entirety.

BACKGROUND

1. Field

Embodiments relate to hashing techniques for determining similarity between data sets.

2. Background Discussion

Researchers working in domains as diverse as engineering, astronomy, biology, remote sensing, economics, and consumer transactions, face larger and larger observations and high dimensional data sets on a regular basis. High dimensional data sets result mostly from an increase in the number of variables associated with each observation or data element.

High-dimensional datasets present many mathematical challenges. One such challenge is that, in many cases, not all variables stored with a high-dimensional data set are important for understanding an underlying phenomenon. Thus, it is of interest in many applications to reduce dimensions of original data prior to any modeling of the data.

Furthermore, as data sets become larger and highly multidimensional, it becomes increasingly important to represent and retrieve data from data sets in an efficient manner. To determine similar elements between the data sets, 'nearest neighbor' algorithms can be used. Nearest neighbor determination schemes, such as locality sensitive hashing (LSH), have been proposed with the goal of approximating a similarity distance metric.

However, conventional nearest neighbor determination schemes are time consuming and require considerable amount of storage space. As a result, data retrieval and similarity detection techniques may not be efficient and can suffer from degradation in performance.

BRIEF SUMMARY

Embodiments relate to hashing techniques used for determining similarity between data sets. Embodiments determine a weighted min-hash value that approximates a similarity distance between data sets. Furthermore, because embodiments can determine a number of bits in the weighted min-hash value, the embodiments allow dimensionality reduction by approximating the weighted min-hash value to a given accuracy in the smallest number of bits.

A method embodiment includes initializing a random number generator with a weighted min-hash value as a seed, wherein the weighted min-hash value approximates a similarity distance between data sets. A number of bits in the weighted min-hash value is determined by uniformly sampling an integer bit value using the random number generator.

A system embodiment includes a repository configured to store a plurality of data sets and a hash generator configured to generate weighted min-hash values from the data sets. The system further includes a similarity determiner configured to determine a similarity between the data sets. In an embodiment, the hash generator further includes a feature extractor configured to extract a plurality of features from the data sets, a random number generator configured to generate a plurality of random numbers using a feature from the extracted features as a seed, and a hash value selector configured to uniformly sample an integer bit value to determine a number of bits in a weighted min-hash value.

In this way, embodiments determine a weighted min-hash value that approximates a similarity distance between data sets.

Further features, and advantages of the embodiments, as well as the structure and operation of the various embodiments are described in detail below with reference to accompanying drawings.

BRIEF DESCRIPTION OF THE DRAWINGS

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments relate to hashing techniques for determining a similarity between data sets. Embodiments determine a weighted min-hash value that approximates a similarity distance between data sets. Furthermore, because embodiments can determine a number of bits in the weighted min-hash value, the embodiments allow dimensionality reduction by approximating the weighted min-hash value to a given accuracy in the smallest number of bits.

Figure 1:
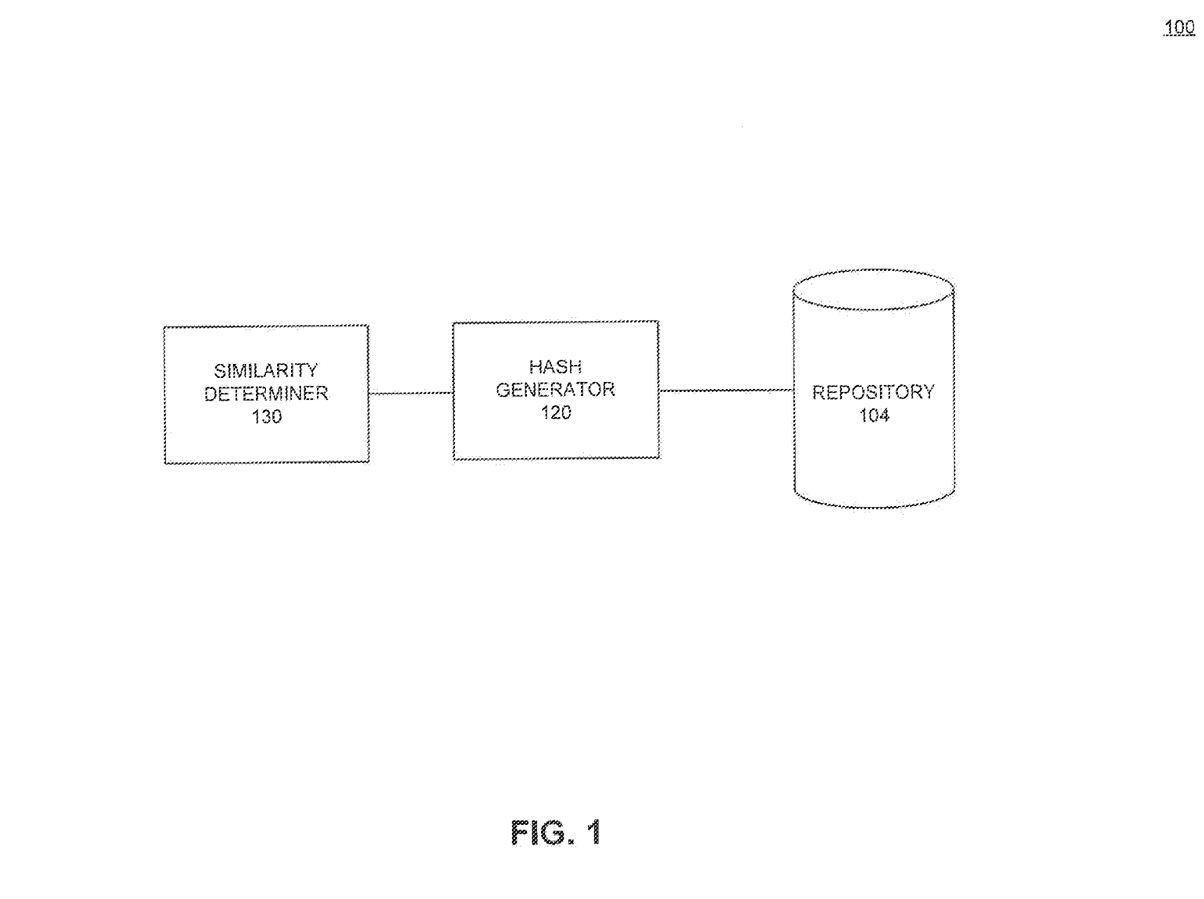
FIG. 1 illustrates a system for hashing and dimensionality reduction, according to an embodiment.

While the present embodiments are described herein with reference to illustrative embodiments for particular applications, it should be understood that the embodiments are not limited thereto. Those skilled in the art with access to the teachings provided herein will recognize additional modifications, applications, and embodiments within the scope thereof and additional fields in which the embodiments would be of significant utility System This section describes a system for hashing of data sets and dimensionality reduction, according to an embodiment illustrated in FIG. 1. FIG. 1 is a diagram of a system 100 for hashing of data sets and dimensionality reduction. While the following is described in terms of data that includes imagery and text, the embodiments are not limited to these types of data. Embodiments can be used in conjunction with any other form of data such as video and audio data. For example, embodiments can be used in any system having generally the structure of FIG. 1, or that would benefit from the operation, methods and functions as described herein. The term 'feature' as used herein can be any form of feature or feature descriptor used to represent images, text, video, audio and/or their characteristics.

System 100 includes similarity determiner 130, hash generator 120 and repository 104. Repository 104 includes a plurality of data sets. Such data sets can include, but are not limited to, digital images, text, video and other forms of data. Such data can be multi-dimensional or even single dimensional data. Data sets in repository 104 can also include histograms used to represent documents (histograms of word terms) or image statistics (histograms of color or texture). In an embodiment, hash generator 120 generates hash values using the data sets present in repository 104. In an embodiment, similarity determiner 130 determines a similarity (e.g. weighted Jaccard similarity) between data sets present in repository 104.

Figure 2:
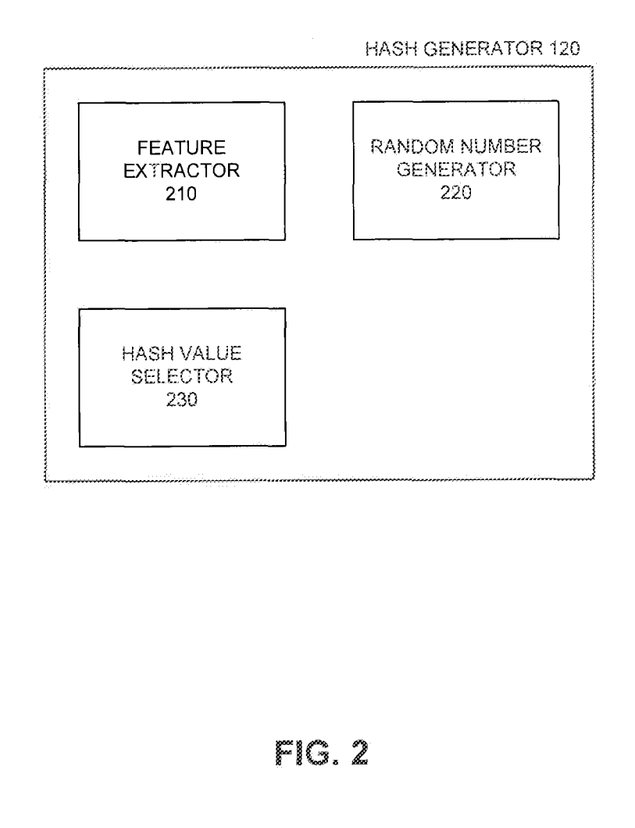
FIG. 2 illustrates a hash generator, according to an embodiment.

As shown in FIG. 2, hash generator 120 further includes feature extractor 210, random number generator 220 and hash value selector 230. The operation of hash generator 120 is described further below.

Weighted Jaccard Similarity

In an embodiment, hash generator 120 determines a weighted min-hash value. As discussed above, and in an embodiment, a weighted min-hash value represents a similarity distance approximation between data sets stored in repository 104. In an embodiment, to compute a weighted min-hash value, similarity determiner 130 determines a weighted Jaccard similarity.

A conventional Jaccard similarity is known to those skilled in the art and is used to evaluate similarity between two data sets, such as text documents represented as groups of words. As an example, a Jaccard similarity of two data sets is defined as the ratio of the size of the intersection of the data sets to the size of their union. For example, when data sets are represented as binary vectors (e.g. sparse binary vectors), (u,v), a Jaccard similarity 'J(u,v)' can be represented as:

$$J(u, v) = \frac{\sum_F \min(u_F, v_F)}{\sum_F \max(u_F, v_F)}$$

where feature F is used to index the elements of the two vectors, and each of $u_F$ and $v_F$ is 0 or 1, indicating feature F's membership in a data set.

Also, as discussed above, $u_F$ and $v_F$ are sparse binary vectors that can be sized as needed and may be indexed by arbitrarily large non-negative integers.

Also, for example, $J(u,v)=0$ when the data sets do not overlap and $J(u,v)=1$ when the data sets are identical.

By mapping data sets into compact vectors of hashes, a Hamming distance of the hash vectors reflects the Jaccard similarity of the sets. Being able to find such a mapping makes it possible not only to store the data sets efficiently but also to perform efficient retrieval. By relaxing the condition that $u_F \in \{0, 1\}$ (i.e., $u_F$ is no longer limited to 0 and 1) and allowing feature weights to be any non-negative numbers, embodiments compute J(u,v) for weighted sets, such as text documents where the weight of a word can be a function of its count and inverse document frequency, or histograms of color and texture in images.

Figure 3:
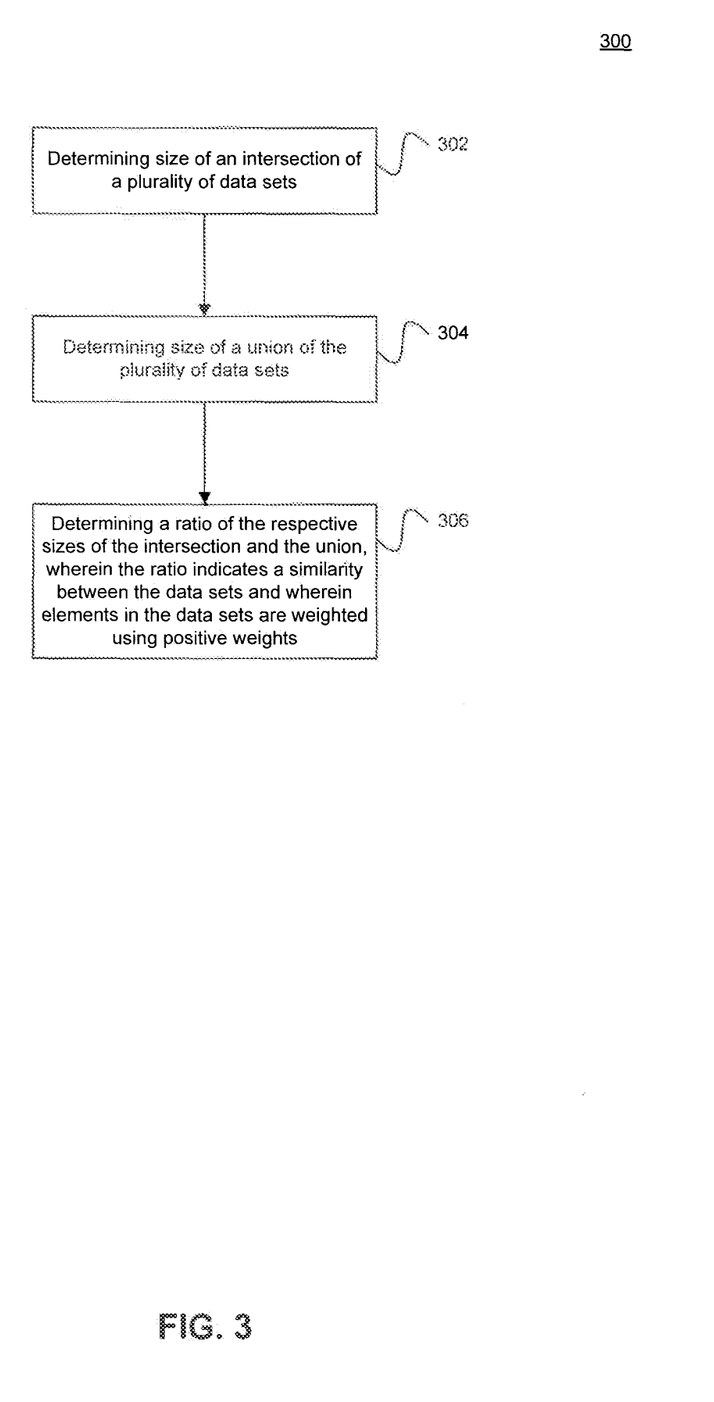
FIG. 3 is a flowchart illustrating an exemplary method to determine a weighted Jaccard similarity, according to an embodiment.

FIG. 3 is a flowchart illustrating an exemplary determination of weighted Jaccard similarity according to an embodiment.

Method 300 begins with determining a size of an intersection of a plurality of data sets (stage 302). As an example, for sparse binary vectors, similarity determiner 130 determines $\Sigma_F \min(u_F, v_F)$.

In stage 304, a size of a union of the plurality of data sets is determined. As an example, for sparse binary vectors, similarity determiner 130 determines $\Sigma_F \min(u_F, v_F)$ In an embodiment stages 302 and 304 may be executed in parallel.

In stage 306, a ratio of the size of the intersection to the size of the union is determined, where the ratio indicates a similarity between the data sets and wherein elements in the data sets are weighted using positive weights.

In this way, the present embodiments, and similarity determiner 130 in particular, determine a weighted Jaccard similarity of data sets using arbitrary non-negative weights.

Weighted Min-Hash

In an embodiment, hash generator 120 determines a weighted min-hash value that is based on and follows the weighted Jaccard similarity discussed above. Thus, for example, a fraction of the hash values that collide (or are similar) between u and v approaches J(u,v) as the number of hash values increases. As discussed above, embodiments allow dimensionality reduction by approximating the weighted min-hash value to a given accuracy in the smallest number of bits. Furthermore, embodiments are also suitable for sparse binary vectors and widely varying feature weights. Embodiments can also be used for near neighbor retrieval because weighted Jaccard similarity can be a monotonic function of L1 similarity distance. The L1 similarity distance is known to those skilled in the art and is often used for computing similarity between color images and other data.

In an embodiment, to compute a weighted min-hash of a vector u of weights, hash generator 120 is initialized by drawing a random number $r_{[F,k]}$ for every possible combination of feature F and index $k \geq 1$. Hash generator 120 then outputs $MH(u) = (F^*, k^*) \arg\min_{F, 1 \leq k \leq uF} r_{[F,k]}$, where MH represents the weighted min-hash.

Thus, in other words, to compute a weighted min-hash of a vector u of weights, feature extractor 210 considers each feature F with $u_F > 0$ (i.e., vector u of weights >0) and initializes random number generator 220 using F as a seed value. Random number generator 220, once initialized, generates $u_F$ random numbers $r_{[F,1]}, \ldots, r_{[F,uF]}$. Hash value selector 230 then selects an output weighted min-hash pair (F,k) for which $r_{[F,k]}$ is minimized.

In an embodiment, to compute multiple weighted min-hash values, hash generator 120 uses (F,h) to initialize random number generator 220, where h=(1 ... H) is the hash index, and H is the total number of hash values to be computed.

Figure 4:
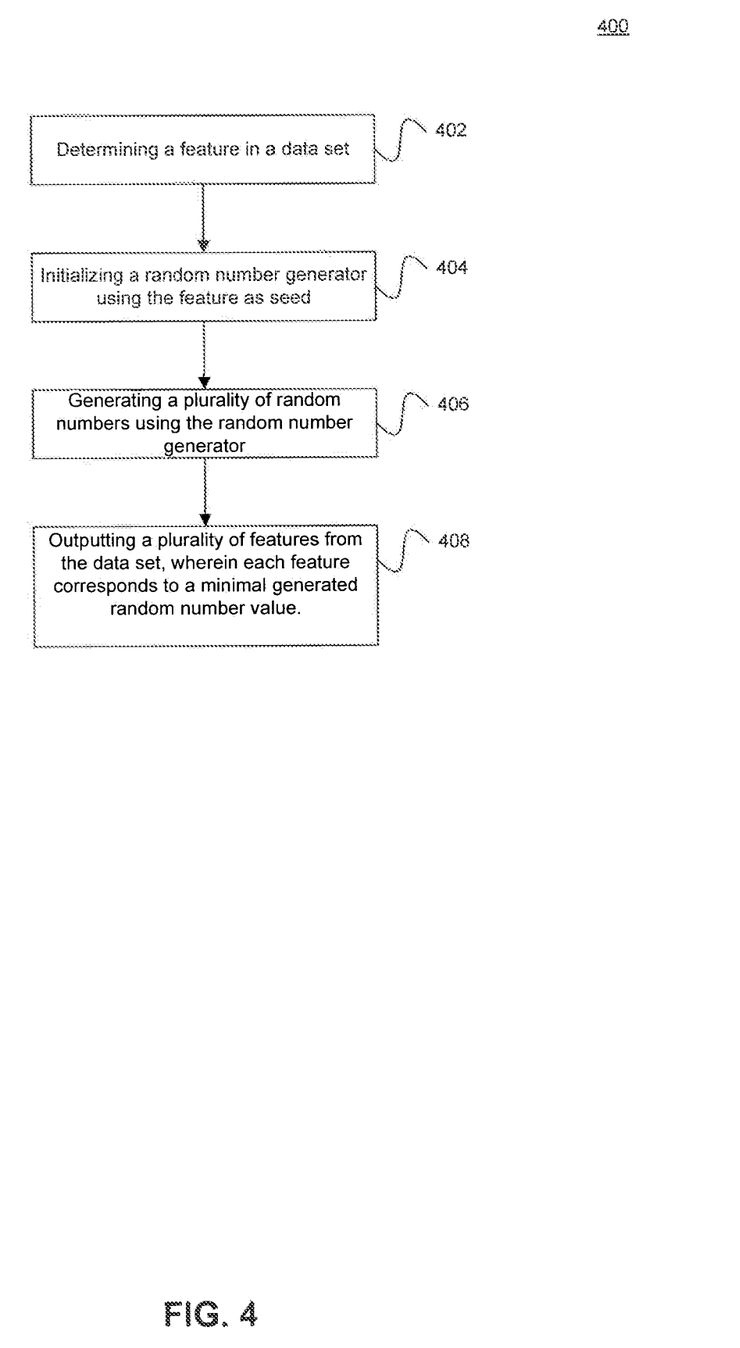
FIG. 4 is a flowchart illustrating an exemplary method to compute a weighted min-hash of a vector, according to an embodiment.

FIG. 4 is a flowchart illustrating an exemplary method to compute a weighted min-hash of a vector u that represents a sparse binary vector of a data set, according to an embodiment.

Method 400 begins with determining a feature in a data set (stage 402). As an example, feature extractor 210 determines a feature F with $u_F > 0$.

In stage 404, a random number generator is initialized using the determined feature as a seed. As an example, hash generator 120 initializes random number generator 220 using feature F as seed.

In stage 406, a plurality of random number values is generated. As an example, random number generator 220, once initialized, generates $u_F$ random numbers $r_{[F,1]}, \ldots, r_{[F,uF]}$.

In stage 408, a plurality of features is outputted from the data set, such that each feature corresponds to a minimal generated random number value. As an example, hash value selector 230 selects an output pair (F,k) for which random number value $r_{[F,k]}$ is minimized.

In this way, embodiments determine a weighted min-hash value. Furthermore, embodiments can also determine weighted min-hash values using arbitrary non-negative weights and thus can be used for normalized (and otherwise transformed) histograms, weighted words, and a wide variety of other data.

Weighted Min-Hash Generation Using Running Minimum Sequence

As discussed above, weighted Jaccard similarity is used to determine weighted min-hash values. In an embodiment, hash generator 120 approximates a weighted Jaccard similarity by dividing all feature weights by an arbitrarily small amount 'Δ', discarding the fractional part, and then determining the weighted min-hash value, using the approximated Jaccard similarity, as discussed above. However, in practice, as Δ can tend to zero, quantized weights (i.e., feature weights divided by Δ) increase, as does the time required for hash computation. The "O" notation is known to those skilled in the art and is generally used to describe the performance or complexity of an algorithm. Thus, O(1/Δ) is used to represent the complexity of the hash computation. As discussed above, Δ can tend to zero. Because Δ can tend to zero, O(1/Δ) complexity increases. However, embodiments can avoid such O(1/Δ) complexity by utilizing a running minimum sequence of random number values generated by random number generator 220.

In an embodiment, given a weight u, random number generator 220 draws random number samples $r_1, \ldots, r_{\lfloor u/\Delta \rfloor}$, and determines a minimum random number value. Embodiments consider the sequence of random numbers $r_1, r_2, \ldots r_{\lfloor u/\Delta \rfloor}$, and for each u, find M(u) as the minimum of the first $\lfloor u/\Delta \rfloor$ elements of the sequence. As an example, M(u) is a non-increasing stepwise-constant function and its value may drop at values u such that $r_{\lfloor u/\Delta \rfloor} < \min_{1 \leq k < \lfloor u/\Delta \rfloor} r_k$. As u increases, M(u) need not increase, and the spacing between M(u)'s discontinuities increases. Therefore, it may take more samples to achieve a value below the current minimum of M(u). To avoid sampling a large number of random number ($r_k$) values, embodiments can sample from the sequence of discontinuities of M(u) using a running minimum sequence. By efficiently sampling the running minimum sequence, embodiments avoid the O(1/Δ) complexity to determine a weighted Jaccard similarity. Because the complexity of weighted Jaccard similarity computation is reduced, embodiments can more efficiently determine a weighted min-hash value.

In an embodiment, a running minimum sequence can be expressed as the sequence of pairs R=(⟨ $X_i, M_i$ ⟩)=((⟨ $K_i \Delta, M_i$ ⟩)) while enumerating points where M(u) experiences a discontinuity. For example, ⟨ $X_i, M_i$ ⟩ are the points where M(u) decreases and thus experiences a discontinuity. Embodiments sort the sequence ((⟨ $X_i, M_i$ ⟩)) so that $X_i$ increases, and therefore $M_i$ decreases. It is to be appreciated that index i need not be a positive value. An exemplary running minimum sequence is described further below with respect to FIG. 5.

In an embodiment, hash generator 120 considers a fixed value W as a base feature weight, and chooses the sequence element:

$$\langle X_0, M_0 \rangle = \left\langle \left(\arg\min_{1 \leq k \leq \lfloor W/\Delta \rfloor} r_k\right)\Delta, \min_{1 \leq k \leq \lfloor W/\Delta \rfloor} r_k \right\rangle$$

where, for a fixed W, ⟨ $X_0, M_0$ ⟩ can be the rightmost such discontinuity point for which $X_0 <$ W. Furthermore, in an embodiment, ⟨ $X_0, M_0$ ⟩ serves as the starting point of a sampling process to enumerate the points where M(u) experiences a discontinuity. As discussed earlier, by sampling points where M(u) experiences a discontinuity, embodiments avoid sampling a large number of random number ($r_k$) values.

In this way, according to an embodiment, R represents a running minimum sequence and each element of R represents the minimum of a prefix of random number sequence '$r_k$'.

Figure 5:
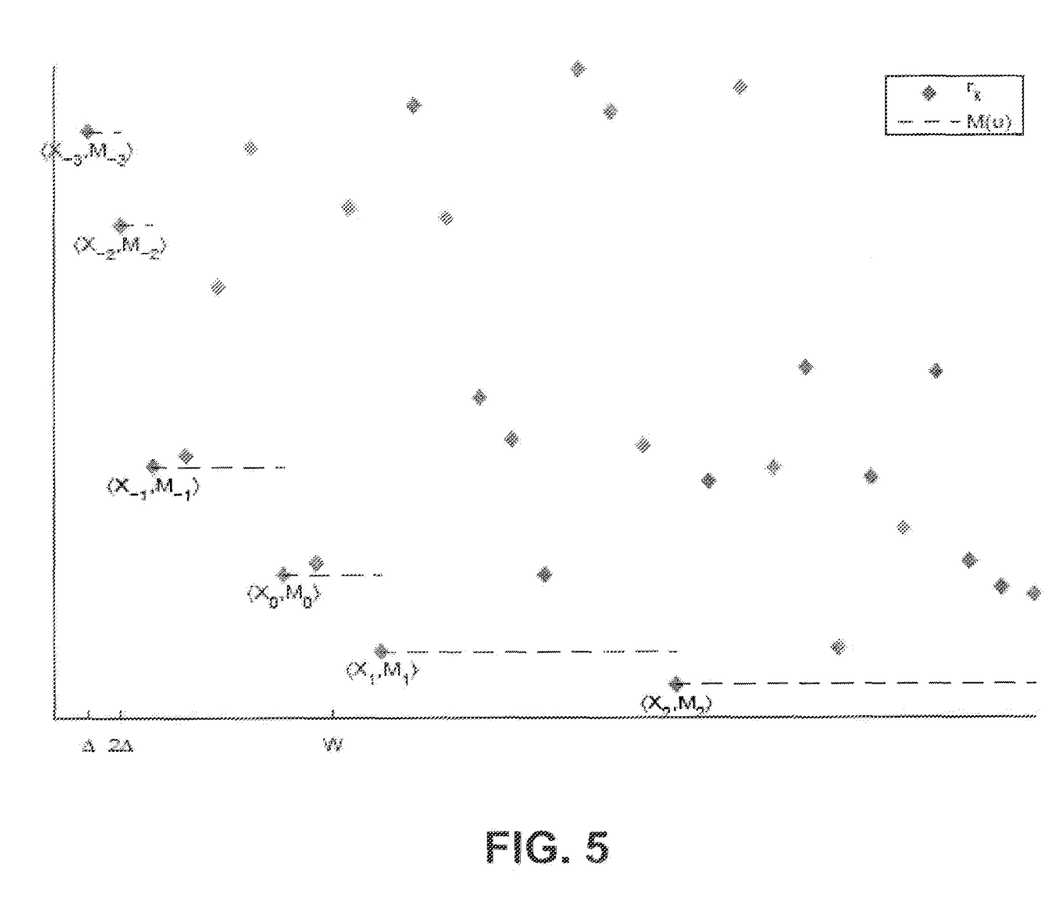
FIG. 5 is a diagram illustrating an exemplary running minimum sequence, according to an embodiment.

FIG. 5 shows an example of a running minimum sequence. FIG. 5 illustrates a scenario where a running minimum sequence is sampled for one feature. Referring to FIG. 5, the y coordinates of the diamond-shaped markers are independent exponential variables $r_k$ with an inter-variable rate of change of Δ. The x coordinates of $r_k$ are spaced Δ apart, so that $\lfloor u/\Delta \rfloor$ variables are sampled for 0<x<u. M(u) is the running minimum of $r_k$ values, and ⟨ $X_i, M_i$ ⟩ are the points where M(u) decreases. For a fixed W, ⟨ $X_0, M_0$ ⟩ is the rightmost such discontinuity point for which $X_0 <$ W, and serves as the starting point of the sampling process. The sampling process proceeds forward or backward over the running minimum sequence to find, for a weight u, the largest i for which $X_i \leq$ u.

In an embodiment, for each feature F with weight of $u_F > 0$, hash generator 120 initializes random number generator 220 using F as the seed. Given the fixed base weight $W_F$ corresponding to F, hash generator 120 samples the running minimum sequence. In an embodiment, hash generator 120 samples the running minimum sequence forward if $u_F > W_F$ and backward if otherwise. Hash generator 120 then determines the last element ⟨ $X_i, M_i$ ⟩ in the sequence for which $Xi \leq u_F$. As an example, hash generator 120 denotes this index i as $i^*_F$ and the value $M_i$ as $M^*_F$. Hash value selector 230 then identifies a feature F with the minimum value of $M^*_F$ and determines the value of the weighted min-hash as the pair (F, $i^*_F$).

As an example, each weighted min-hash function can be thought of as an independent sample from a family H of functions, parameterized by hash index h. Thus, in an embodiment, to compute a set of hashes, hash generator 120 repeats the above procedure for hash indexes h=1 ... H, and uses the pair (F,h) to initialize the random number generator 220.

In this way, a weighted min-hash value can be determined using a running minimum sequence.

Figure 6:
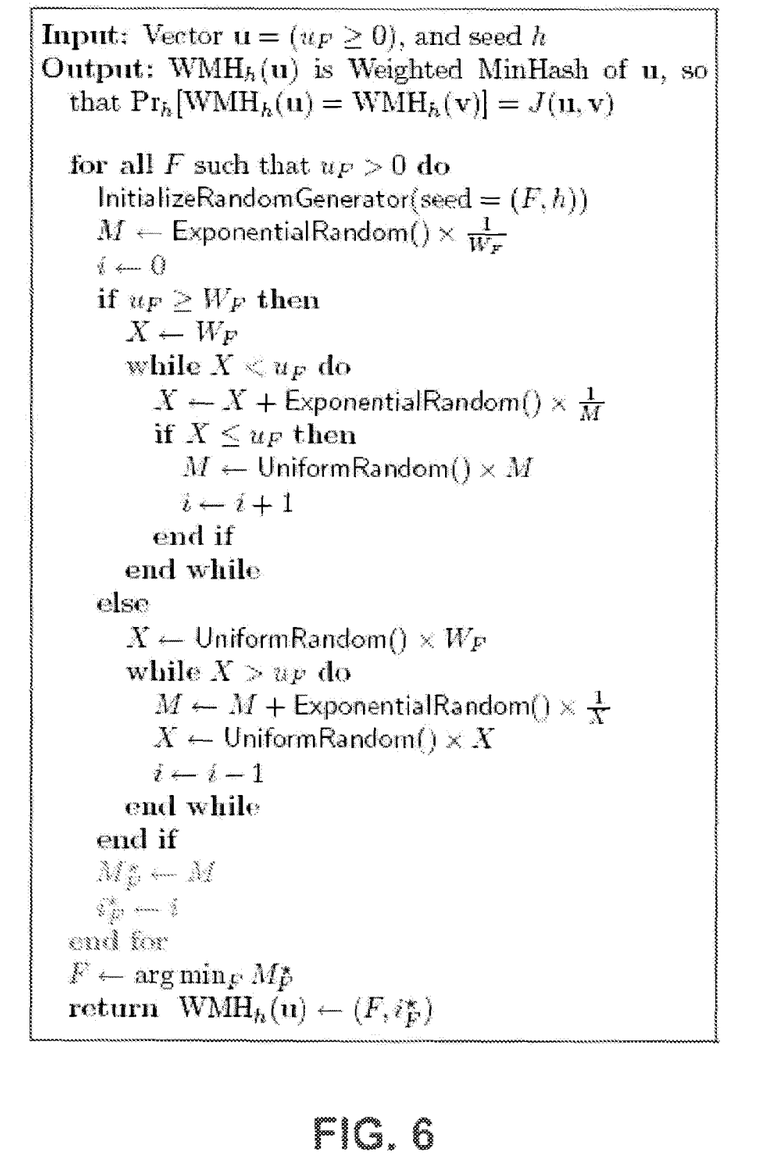
FIG. 6 illustrates exemplary pseudo-code to compute a weighted min-hash value, according to an embodiment.

FIG. 6 illustrates an exemplary pseudo-code to compute a weighted min-hash value, according to an embodiment discussed above. It is to be appreciated that the exemplary pseudo-code is disclosed for the purposes of illustration and is not intended to limit the embodiments.

Weighted Min-Hash and Dimensionality Reduction

In many cases, not all variables stored with a high-dimensional data set are important for understanding an underlying phenomenon of interest. Thus, there is a need to represent data using as few bits as possible, while being able to reconstruct similarity distances with certain accuracy. Because embodiments can determine a number of bits in a weighted min-hash value, the embodiments allow dimensionality reduction by approximating the weighted min-hash value to a given accuracy in a smallest number of bits.

In an embodiment, to represent a hash value using 'b' bits, given the weighted min-hash value $WMH_h(u)$, hash value generator 120 initializes random number generator 220 using $(h, WMH_h(u))$ as a seed. Hash value selector 230 then samples an integer b-bit value $WMH_h^{(b)}$ uniformly from $\{0 \ldots 2^b-1\}$ to determine a b bit weighted min-hash value.

Figure 7:
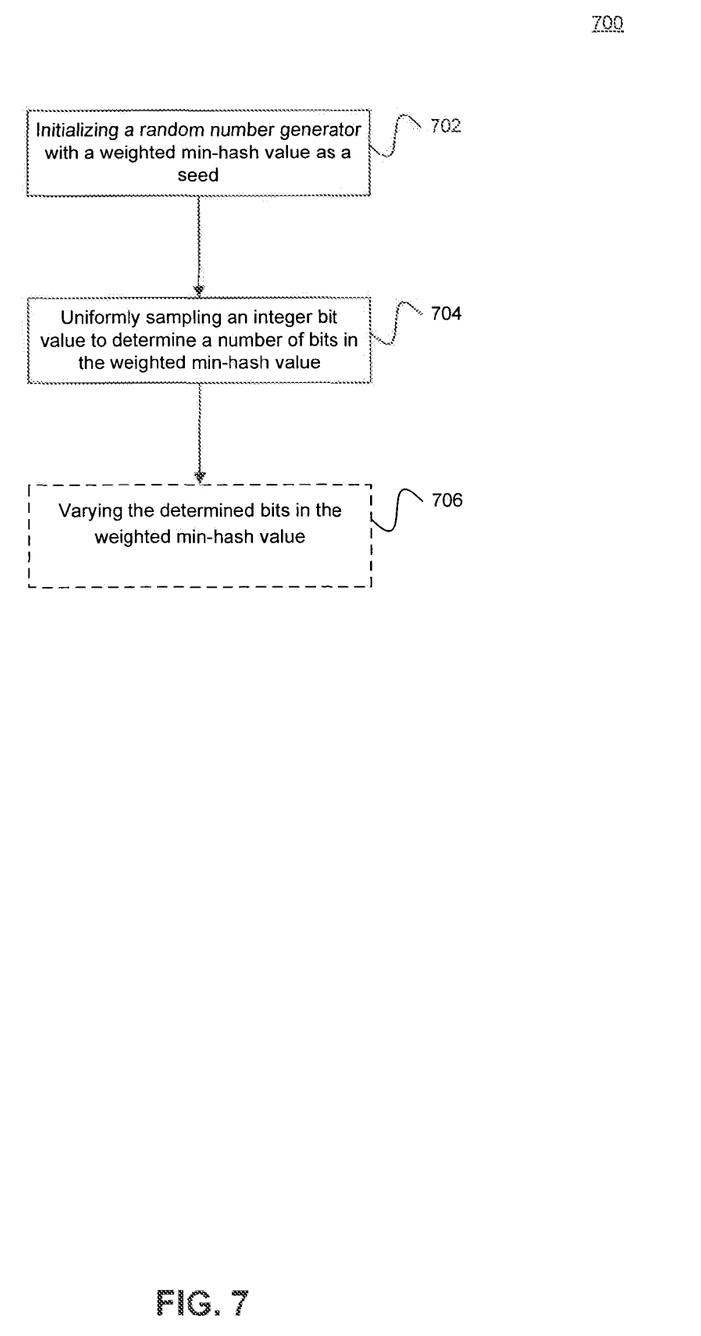
FIG. 7 is a flowchart illustrating an exemplary method to determine a number of bits in a weighted min-hash value, according to an embodiment.

FIG. 7 is a flowchart illustrating an exemplary determination of a number of bits of a weighted min-hash value, according to an embodiment.

Method 700 begins with initializing a random number generator with a weighted min-hash value as a seed (stage 702). As an example, given the weighted min-hash value $WMH_h(u)$, hash value generator 120 initializes random number generator 220 using $(h, WMH_h(u))$ as a seed.

In stage 704, an integer b-bit value is sampled by the random number generator initialized in stage 702. As an example, hash value selector 230 samples an integer b-bit value $WMH_h^{(b)}$ uniformly from $\{0 \ldots 2^b-1\}$ to determine a b bit weighted min-hash value that satisfies a given weighted min-hash accuracy in a smallest number of bits.

In stage 706, which can be optionally performed, hash value selector 230 varies the number of bits determined in stage 704 to improve a weighted min-hash accuracy. Because the weighted min-hash value represents a similarity distance approximation between data sets, the similarity distance approximation is thus improved.

As an example, consider the case of fixed feature vectors u and v with known similarity distance $\|u-v\|_1 = D$. In an embodiment, such a similarity distance may be computed by similarity determiner 130. Embodiments enable a dimension reduction method that approximates $\|u-v\|_1$ to a given accuracy in the smallest number of bits.

In an embodiment, for a weighted min-hash value, this accuracy depends not only on $\|u-v\|_1$ but also on $\|u\|_1 + \|v\|_1$. Thus, embodiments are able to perform dimensionality reduction with respect to b for different values of $\|u\|_1 + \|v\|_1$. In this way, for u and v which are a given similarity distance apart, embodiments can use fewer bits for a given quality of L1 approximation.

Embodiments also achieve improved L1 normalizations of the vectors (u,v) while preserving the L1 distances between them. Embodiments achieve this by computing, for each feature F, its median $m_F$ over a data set, and then subtracting $m_F$ from the weight $u_F$ of the feature in every vector u. If such a transformation results in negative weights, embodiments transform one weight $u_F$ into a pair of weights, $u_F+$, $u_F-$, as shown below.

$$(u_F+, u_F-) = (\max(0, u_F - m_F), \max(0, m_F - u_F))$$

In this way, the above transform reduces the sum of the L1 norms over a data set, while preserving the L1 distances. This results in more accurate distance approximation, for a given feature descriptor size. Furthermore, when vectors such as u and v are not known, embodiments utilize statistics associated with u and v to perform sampling of bits in an integer b-bit value.

Selection of Hash Subsets

In an embodiment, given a set of weighted min-hash values to choose from, hash value selector 230 selects a hash subset associated with the highest similarity distance approximation. A hash subset is selected in a manner that not only performs well on training data, but also on all other real-world data sets.

In a non-limiting embodiment, hash value selector 230 selects hash subsets using a randomized hash selection procedure. At each stage, hash value selector 230 randomly draws a subset of hashes from the weighted min-hash values, and adds the subsets with associated with the highest similarity distance approximation to a set of selected hashes. Embodiments perform the hash selection using different sizes of random subsets, and select an optimal subset size using cross-validation. While embodiments discussed above operate in weight dependent time (i.e., computational time may vary based on feature weight), embodiments can also operate in deterministic (or non-random) constant time. An embodiment operating in deterministic constant time is discussed below.

Consistent Weighted Sampling in Deterministic Constant Time

In a consistent weighted sampling method, the probability of drawing identical samples for inputs S and T is equal to their Jaccard similarity J(S,T) represented as:

$$J(S, T) = \frac{\sum_k \min(S_k, T_k)}{\sum_k \max(S_k, T_k)},$$

where k is an index.

Embodiments can operate in deterministic constant time per non-zero weight (e.g., feature weight), improving on conventional approaches that utilize an expected constant time. Samples (e.g. samples drawn by random number generator 220) can be used as a weighted min-hash value for efficient retrieval and compression under a Jaccard or l1 metric. It is to be appreciated that the embodiments can be applied to any consistent weighted sampling scheme and are not limited to weighted min-hash. Conventional consistent sampling algorithms which operate in expected constant time per non-zero weight can require numerous optimizations to perform efficiently. In contrast to conventional methods, embodiments operate in deterministic constant time per non-zero weight. This approach, according to the embodiments, is simpler to implement, and has the added advantage of using a fixed number of random values (e.g., 3 random numbers per index k) for sampling. Because embodiments utilize a fixed number of random values, given a possible set of indices, all random values can be generated offline. In this way, embodiments improve sampling performance by pre-computing random values needed for sampling. Furthermore, by randomly mapping hashes to b-bit representations, embodiments provide simpler estimators of the distances between inputs, given Hamming distances between their hash vectors.

A sampling algorithm that operates in deterministic constant time per non-zero weight is discussed below.

Generating b-Bit Hashes

Embodiments utilize a scheme to represent each hash using a given number 'b' of bits where 'b' is based on a tradeoff between the number of hashes and their accuracy. As noted above, the method discussed below applies to any hashing scheme and is not limited to weighted min-hash. Furthermore, the method discussed below with respect to FIG. 8 allows use of simple analysis and estimators of distances given a number of hash collisions while operating in deterministic constant time.

Figure 8:
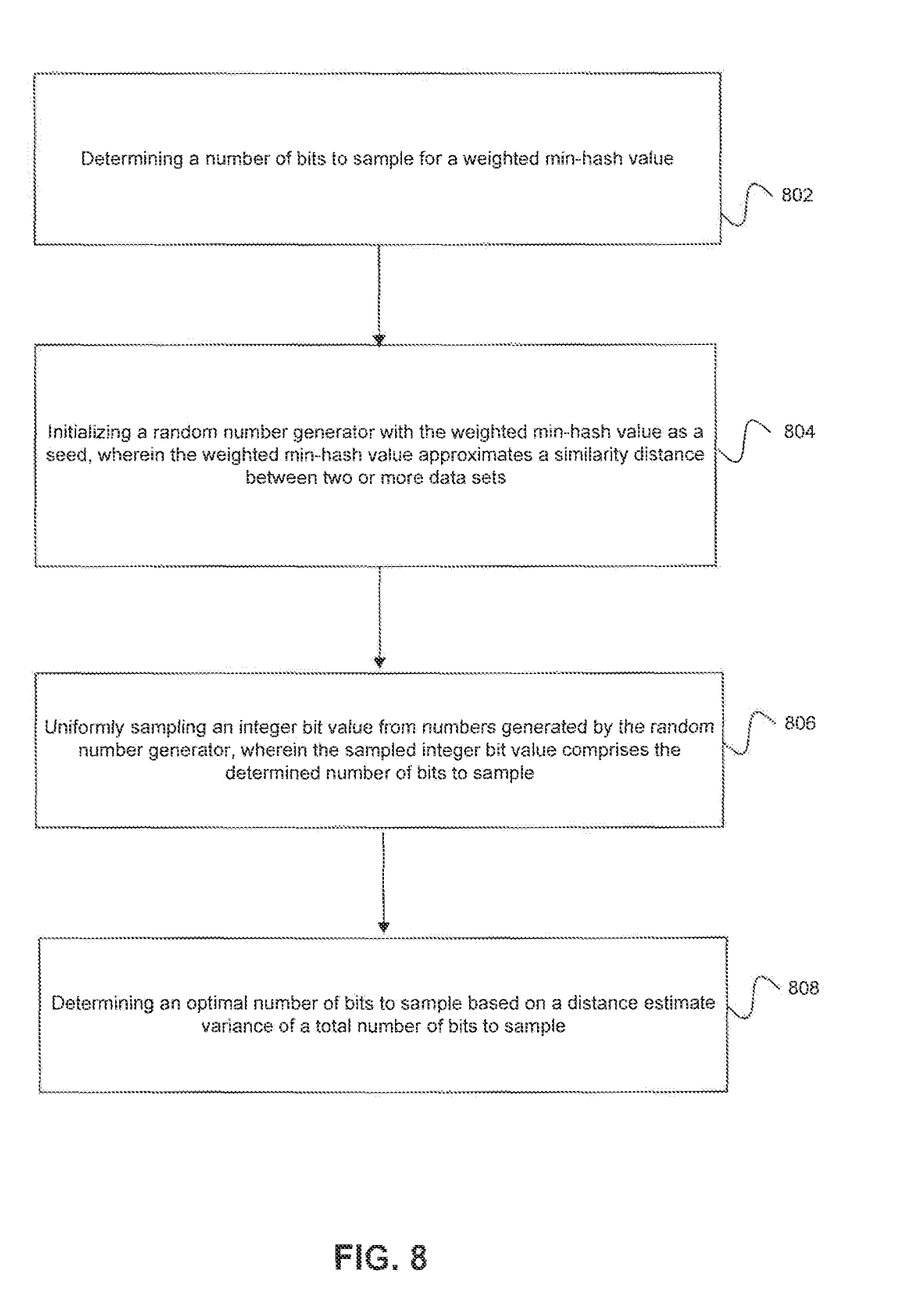
FIG. 8 is a flowchart illustrating an exemplary method to determine a number of bits in a weighted min-hash value, according to another embodiment.
Figure 9:
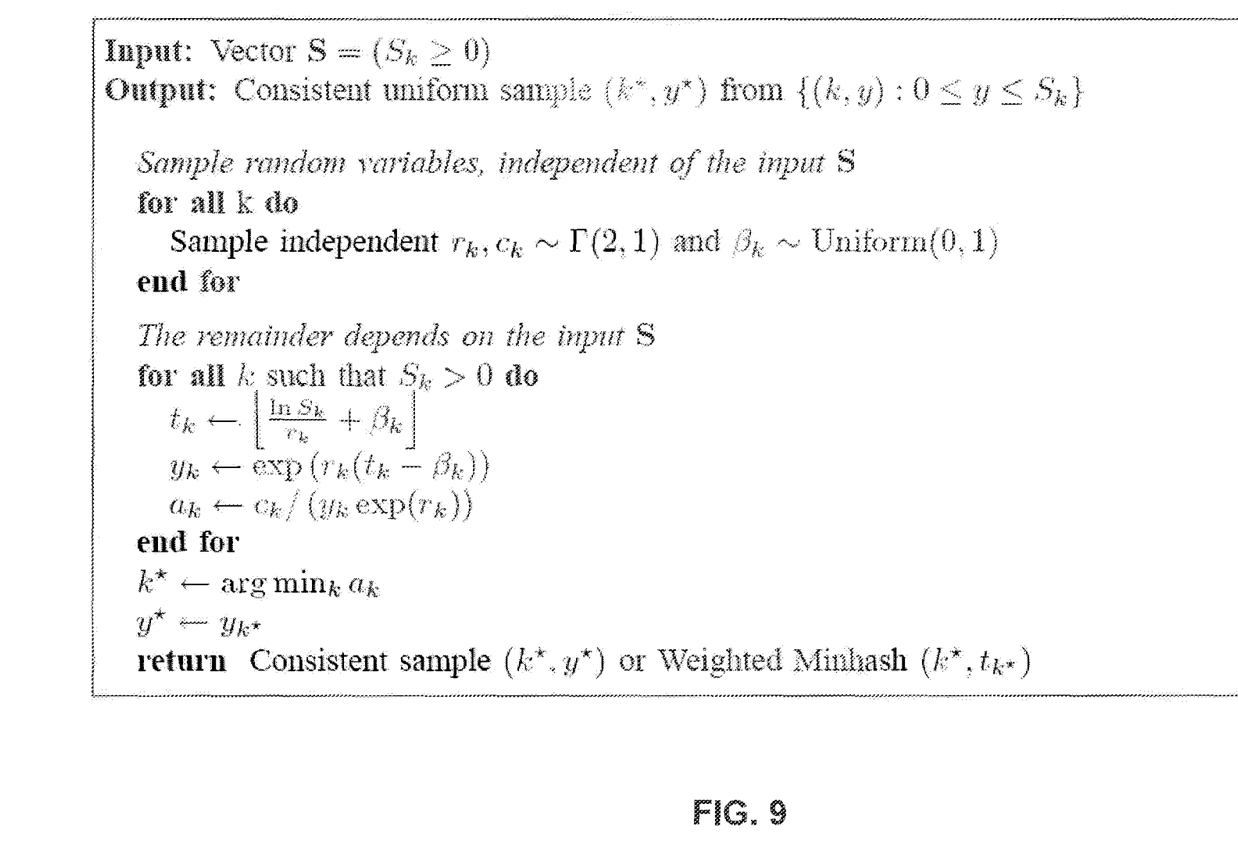
FIG. 9 illustrates an exemplary pseudo-code to draw a uniform consistent sample, according to an embodiment.

FIG. 8 is a flowchart illustrating an exemplary determination of a number of bits of a weighted min-hash value, according to an embodiment that operates in deterministic constant time.

Method 800 begins with determining a number of bits to sample for a weighted min-hash value (stage 802). As an example, a number of bits, b, are determined or selected based on a random number generation and/or a selection based on prior data and/or experience.

In stage 804, a random number generator is initialized with the weighted min-hash value as a seed, wherein the weighted min-hash value approximates a similarity distance between two or more data sets. According to an example embodiment, a hash value $WMH_h(S)$, which may substantially correspond to the weighted min-hash value $WMH_h(u)$ referenced above, can be randomly mapped to a b-bit value. For example, random number generator 220 can be initialized using (h, $WMH_h(S)$) as the seed.

In stage 806, an integer bit value is uniformly sampled from numbers generated by the random number generator, wherein the sampled integer bit value comprises the determined number of bits to sample. As an example, hash value selector 230 uniformly samples an integer b-bit value $WMH_h^{(b)}$ is sampled uniformly from the generated set (e.g., 0 to $2^b-1$).

In stage 808, an optimal number of bits to sample is determined based on distance estimate variances of a total number of bits to sample. An as example, hash value selector 230 varies the number of bits determined in stage 808 to improve a weighted min-hash accuracy. Because the weighted min-hash value represents a similarity distance approximation between data sets, the similarity distance approximation is thus improved.

In an embodiment, the number of bits used to represent each weighted min-hash $WMH_h$, which may be similar to the weighted hash $WMH_h$ referenced above, can be varied. The number of 'b' bits used to represent a hash value correspond to how much storage space is necessary, required and/or otherwise available to store the hash values, where a greater number of b-bits may consume or require more space and/or other resources. While increasing the number of b-bits used to store hash values may consume more resources, a larger number of b-bits may also increase the accuracy of similarity measures and increase processing time required to determine similarity (and/or differences) between data sets. Correspondingly, reducing the number of b-bits used to store hash values may consume fewer resources, reduce processing time but also reduce the accuracy of similarity estimates. Embodiments determine a number of b-bits to use that provide a requisite or desired level of accuracy while consuming a minimal amount of space and resources.

One approach to determine the number of b-bits to use is to use a standard compression technique to average the number of bits per hash, which can be, roughly, the entropy of the hash. This approach, however, can be expensive to implement as distance computations between hashes increase and as each hash needs to be decompressed on the fly. Reducing the number of bits per hash (as compared to the number of bits per hash used in the standard compression technique) can allow the use of more hashes. Though this may result in some spurious hash collisions, the additional collisions would not be enough to affect distance estimates.

As referenced above, each hash is represented given a number b bits, where b trades off between the number of hashes and their accuracy. That is, for example, a fewer number of bits may yield a reduced level of accuracy. Embodiments herein however determine b such that b uses a minimal amount of space (e.g., to store the bits of the hash) while maintaining an acceptable level of accuracy.

According to an example embodiment, and as noted above, a hash value $WMH_h(S)$, which may substantially correspond to the weighted min-hash value $WMH_h(u)$ referenced above, can be randomly mapped to a b-bit value. For example, random number generator 220 can be initialized using (h, $WMH_h(S)$) as the seed. Then for example, an integer b-bit value $WMH_h^{(b)}$ is sampled uniformly from the generated set (e.g., 0 to $2^b-1$).

If for example, in the generated set, original hashes are equal, then the b-bit hashes may be equal as well. On the other hand, when original hashes are not equal, the b-bit hashes collide with a probability of $2^{-b}$. Therefore, $$Pr[WMH_h^{(b)}(S)=WMH_h^{(b)}(T)]=J+(1-J)\times 2^{-b}=J^{(b)}$$

and, denoting by $HashSim_H^{(b)}$ the Hamming similarity of H b-bit hashes, it can be approximated $$J = \frac{J^{(b)} - 2^{-b}}{1 - 2^{-b}} \approx \frac{HashSim_H^{(b)} - 2^{-b}}{1 - 2^{-b}}$$

From this, the variance of the estimate d of the distance $d=\|S-T\|_1$ depends on H and b as follows:

$$Var[\hat{d}^{(b)}] = \frac{J^{(b)}(1-J^{(b)})}{H} \times \left(\frac{\partial J^{(b)}}{\partial d}\right)^{-2}$$

Denoting by B the total number of bits available, H=B/b, and $$Var[\hat{d}^{(b)}] = \frac{d(N+d)^2(N-d(1-2^{t-b}))b}{2N^2(1-2^{-b})B}$$

The distance estimate variance computed above allows the optimal number of bits b to represent each hash. In an example embodiment, it can be assumed that the pairs of vectors have similar distances d and sums of norms N. Alternatively, b can be chosen empirically to obtain the most accurate estimate ($\hat{d}$) for the vector pairs of interest.

Figure 10:
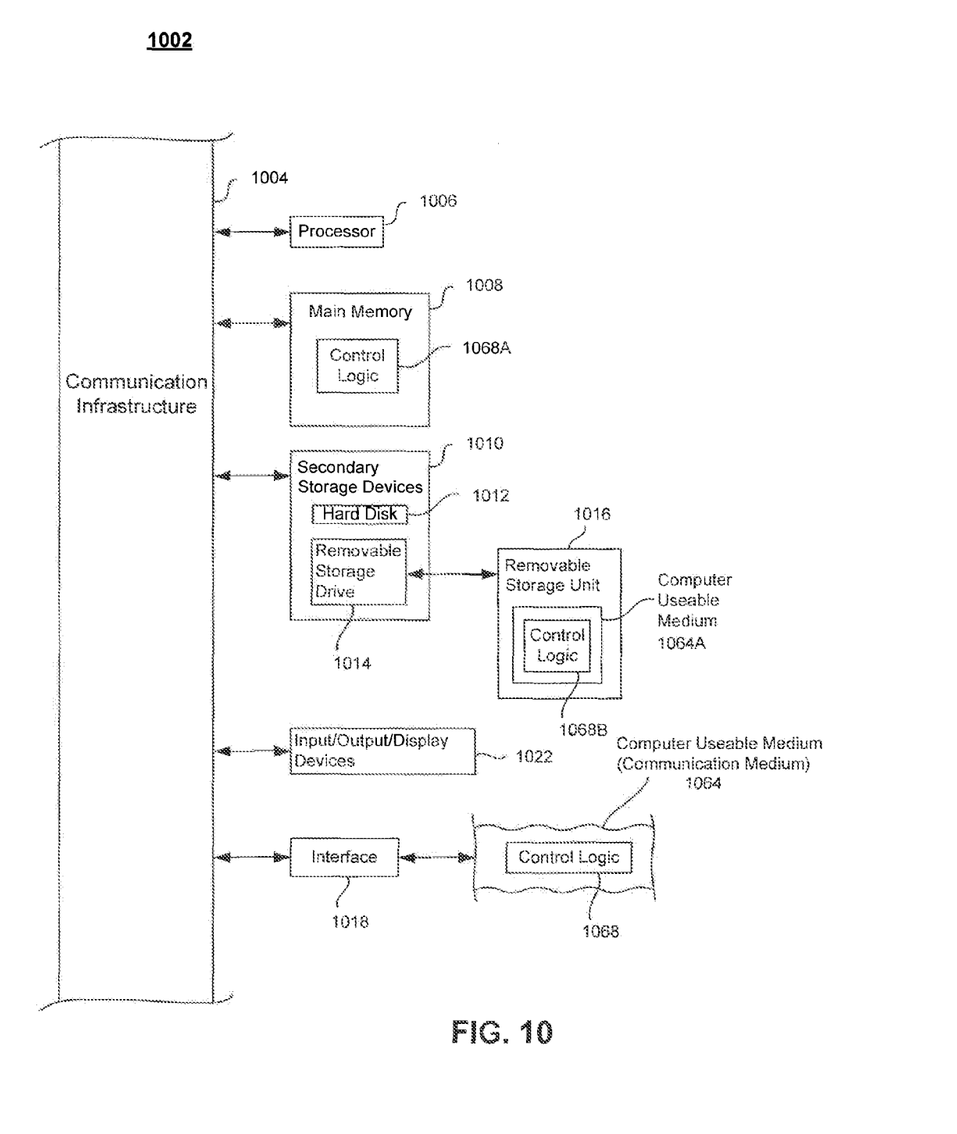
FIG. 10 illustrates an example computer useful for implementing components of the embodiments.

FIG. 10 illustrates an exemplary pseudo-code to draw a uniform consistent sample, according to an embodiment discussed above. It is to be appreciated that the exemplary pseudo-code is disclosed for the purposes of illustration and is not intended to limit the embodiments. Referring to the pseudo-code of FIG. 10, the resulting (k*, y*) (or, equivalently, (k*,$t_k$*)) can be used as a weighted min-hash, where the probability of hash collision for inputs S and T equals the Jaccard similarity J(S,T).

Example Computer Embodiment

In an embodiment, the system and components of embodiments described herein are implemented using well known computers, such as example computer 1002 shown in FIG. 10. For example, hash generator 120 or similarity determiner 130 can be implemented using computer(s) 1002.

Computer 1002 can be any commercially available and well known computer capable of performing the functions described herein, such as computers available from International Business Machines, Apple, Sun, HP, Dell, Compaq, Cray, etc.

Computer 1002 includes one or more processors (also called central processing units, or CPUs), such as a processor 1006. Processor 1006 is connected to a communication infrastructure 1004.

Computer 1002 also includes a main or primary memory 1008, such as random access memory (RAM). Primary memory 1008 has stored therein control logic 1068A (computer software), and data.

Computer 1002 also includes one or more secondary storage devices 1010. Secondary storage devices 1010 include, for example, a hard disk drive 1012 and/or a removable storage device or drive 1014, as well as other types of storage devices, such as memory cards and memory sticks. Removable storage drive 1014 represents, for example, a floppy disk drive, a magnetic tape drive, a compact disk drive, an optical storage device, tape backup, etc.

Removable storage drive 1014 interacts with a removable storage unit 1016. Removable storage unit 1016 includes a computer useable or readable storage medium 1064A having stored therein computer software 1068B (control logic) and/or data. Removable storage unit 1016 represents a floppy disk, magnetic tape, compact disk, DVD, optical storage disk, or any other computer data storage device. Removable storage drive 1014 reads from and/or writes to removable storage unit 1016 in a well-known manner.

Computer 1002 also includes input/output/display devices 1022, such as monitors, keyboards, pointing devices, Bluetooth devices etc.

Computer 1002 further includes a communication or network interface 1018. Network interface 1018 enables computer 1002 to communicate with remote devices. For example, network interface 1018 allows computer 1002 to communicate over communication networks or mediums 1064 (representing a form of a computer useable or readable medium), such as LANs, WANs, the Internet, etc. Network interface 1018 may interface with remote sites or networks via wired or wireless connections.

Control logic 1068 may be transmitted to and from computer 1002 via communication medium 1064.

Any tangible apparatus or article of manufacture including a computer useable or readable medium having control logic (software) stored therein is referred to herein as a computer program product or program storage device. This includes, but is not limited to, computer 1002, main memory 1008, secondary storage devices 1010 and removable storage unit 1016. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and a server or a combination of both.

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way.

The present embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described exemplary embodiments, but should be defined only in accordance with the following claims and their equivalents.

What is claimed is:

1. A computer implemented method of improving similarity distance approximation between data sets, comprising:

initializing, using one or more processors, a random number generator with a weighted rain-hash value as a seed, wherein the weighted min-hash value approximates the similarity distance between two or more data sets;

uniformly sampling, using the one or more processors, an integer bit value using the random number generator to determine a first number of bits used to represent a single weighted min-hash value;

determining, using the one or more processors, an adjusted number of bits to sample based on distance estimate variances of a total number of bits to sample; and varying, using the one or more processors, the determined first number of bits used to represent the single, weighted min-hash value to determine a least number of bits capable of being used to represent the single weighted rain-hash value while achieving a target weighted rain-hash accuracy, wherein the weighted min-hash accuracy specifies a similarity distance approximation between the data sets; and adjusting a number of bits used to represent the single weighted rain-hash value based on the determined least number of bits.

2. The method of claim 1, wherein the sampling minimizes inconsistency between the similarity distance and the approximation induced by the Hamming distance between bit samples.

3. The method of claim 1, further comprising: selecting a plurality hash subsets from a plurality of weighted rain-hash values.

4. The method of claim 3, wherein the selecting comprises: selecting the hash subsets using randomized hash selection.

5. The method of claim 3, further comprising: adding hash subsets associated with the highest similarity distance approximation to a set of selected hashes.

6. An article of manufacture including a non-transitory computer-readable medium having instructions stored thereon that, when executed by a processing device, cause the processing device to perform operations comprising:

initializing, using one or more processors, a random number generator with a weighted min-hash value as a seed, wherein the weighted min-hash value approximates a similarly distance between two or more data sets;

uniformly sampling, using the one or more processors, an integer bit value using the random number generator to determine a first number of bits used to represent a single weighted min-hash value;

determining, using the one or more processors, an adjusted number of bits to sample based on distance estimate variances of a total number of bits to sample; and varying, using the one or more processors, the determined first number of bits used to represent a single weighted min-hash value to determine a least number of bits capable of being used to represent, the single weighted rain-hash value while achieving a target weighted min-hash accuracy, wherein the weighted rain-hash accuracy specifies a similarity distance approximation between the data sets; and adjusting a number of bits used to represent the single weighted min-hash value based on the determined least number of bits.

7. The article of manufacture of claim 6, wherein the sampling minimizes a Hamming distance between the data sets.

8. The article of manufacture of claim 6, the operations further comprising: selecting a plurality hash subsets from a plurality of weighted rain-hash values.

9. The article of manufacture of claim 8, the selecting comprising:

selecting the hash subsets using randomized hash selection.

10. The article of manufacture of claim 8, the operations further comprising: adding hash subsets with associated with the highest similarity distance approximation to a set of selected hashes.

11. A computer implemented method of improving similarity distance approximation between data sets, comprising:

determining, using one or more processors, a number of bits to sample for a weighted min-hash value; initializing, using the one or more processors, a random number generator with the weighted min-hash value as a seed, wherein the weighted min-hash value approximates a similarity distance between two or more data sets;

uniformly sampling, using the one or more processors, an integer bit value from numbers generated by the random number generator, wherein the sampled integer bit value comprises the determined number of bits to sample, wherein the sampling is performed in deterministic constant time, and wherein deterministic constant time sampling comprises pre-computing estimators of a distance between the two or more data sets based on random values; and determining a number of bits to sample based on a distance estimate variance of a total number of bits available and the determined number of bits; and varying, using the one or more processors, the determined first number of bits used to represent a single weighted min-hash value to determine a least number of bits capable of being used to represent the single weighted rain-hash value while achieving a target weighted min-hash accuracy, wherein the weighted min-hash accuracy specifies a similarity distance approximation between the data sets; and adjusting a number of bits used to represent the single weighted rain-hash value based on the determined least number of bits.

12. The method of claim 11, further comprising determining a Hamming similarity of the determined number of bits to sample for the weighted min-hash value.

13. The method of claim 11, wherein the one or more bits are sampled from one or more images.

* * * * *